Nov. 5, 1929.  E. G. RATZ  1,734,229
ELECTRICAL MEASURING INSTRUMENT
Filed Dec. 9, 1927  2 Sheets-Sheet 1
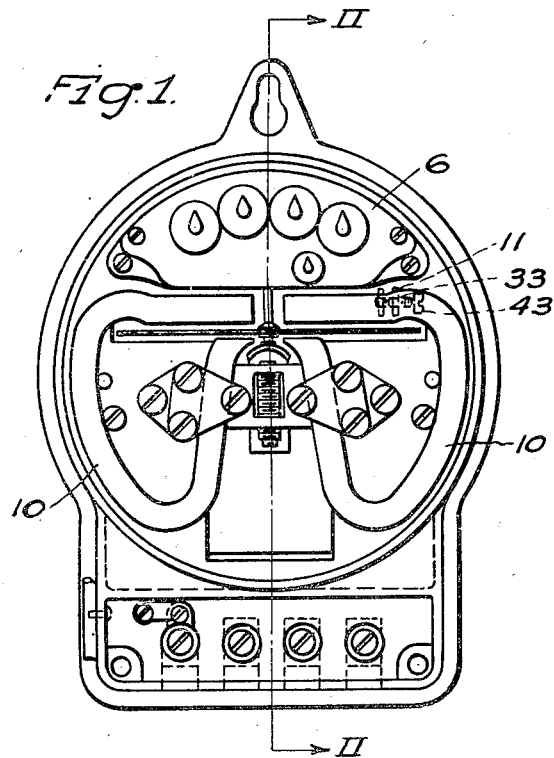
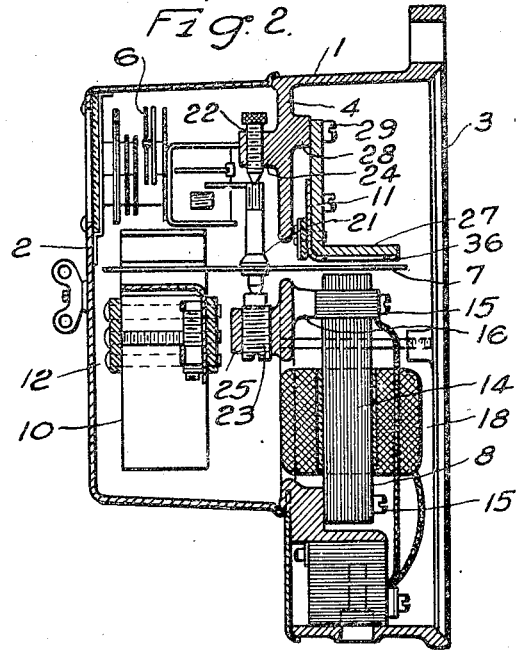
INVENTOR
*Elmer G. Ratz.*
BY
*Wesley L. Carr*
ATTORNEY

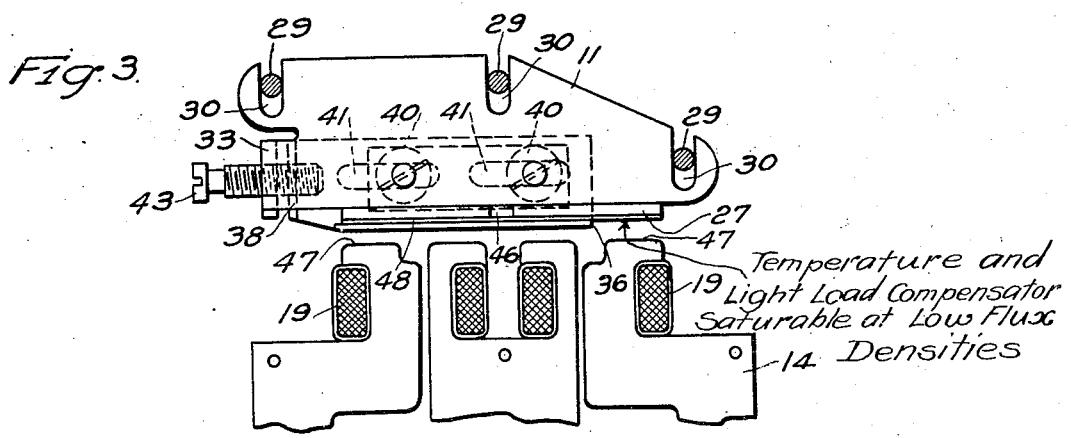
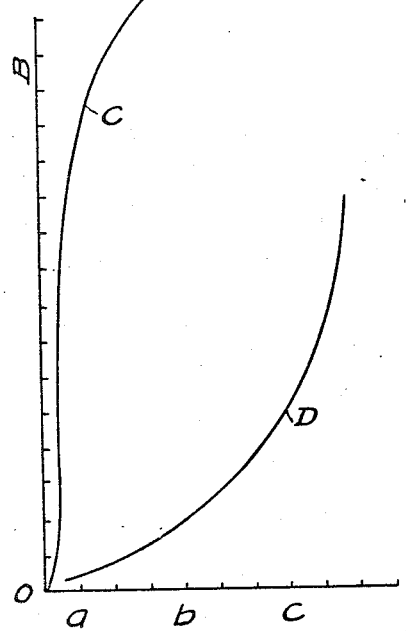
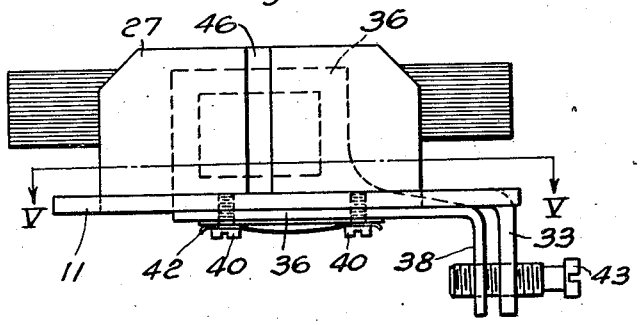
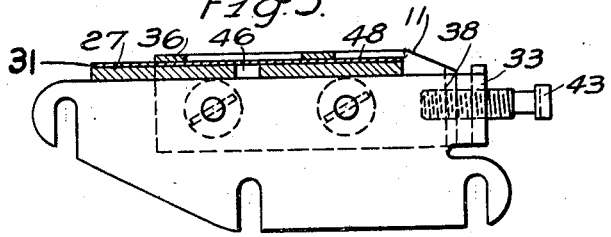
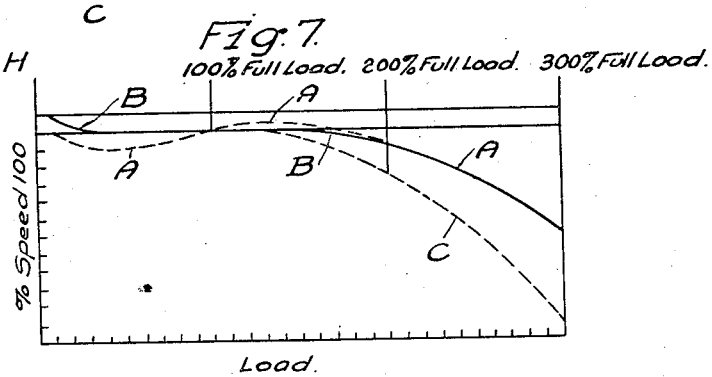

Patented Nov. 5, 1929

1,734,229

UNITED STATES PATENT OFFICE

ELMER G. RATZ, OF HAMILTON, ONTARIO, CANADA, ASSIGNOR TO WESTINGHOUSE ELECTRIC & MANUFACTURING COMPANY, A CORPORATION OF PENNSYLVANIA

ELECTRICAL MEASURING INSTRUMENT

Application filed December 9, 1927. Serial No. 238,763.

My invention relates to electrical measuring instruments and comprehends a novel type of induction watthour meter and a method of operating the same.

It is a purpose of my invention to provide means for improving the accuracy of induction meters and especially to compensate such meters for inaccuracies arising from temperature and overload variations.

It is well known in the art pertaining to watthour meters that such instruments, with a constant load, have a tendency to run fast with an increase in temperature and, conversely, also, have a tendency to run slow with a decrease in temperature. It is equally well known that a watthour meter has an inherent characteristic to register a lower percentage when the magnitude of the quantity being measured increases beyond a certain point, which point is usually attained at approximately full load. Also over a certain portion of the inherent registration curve of a meter, usually at lighter loads in the ordinary meter, there is a slight increase in the percent registration with an increase in the quantity measured.

My present invention comprises an improvement in electrical measuring instruments and has particular reference to watthour meters of the character described in United States Letters Patent No. 1,584,649, entitled Watthour meters, issued to me on May 11, 1926.

For an understanding of my invention, reference may be had to the accompanying drawings, taken in connection with the following description.

In the drawings,

Figure 1 is a front elevational view of a watthour meter embodying my invention, the cover thereof being removed for the sake of clearness, Fig. 2 is a view, partially in section and partially in elevation, of the device shown in Fig. 1, Fig. 3 is a detailed rear elevational view of parts of the meter, showing particularly the light-load adjusting mechanism in its relation to the electromagnet of the meter, Fig. 4 is a detailed plan view of the magnetic keeper shown in Fig. 1, Fig. 5 is a view, partially in elevation and partially in section, taken on the line V—V of Fig. 4, Fig. 6 is a graphical representation of the magnetic characteristic of the keeper shown in Fig. 4, and Fig. 7 is a graphical representation of the speed-load curves of the watthour meter shown in Fig. 1, taken before and after the addition of my improvement to the meter.

A watthour meter constructed in accordance with my invention comprises, preferably, a casing 1 of a cast metal having a front or cover portion 2 and a rear wall member 3. The base portion of the casing comprises a wall portion 4 intermediate the members 2 and 3 which supports an integrating mechanism 6, an armature disk 7, an electromagnet 8, damping magnets 10, and a keeper 11 for the electromagnet 8. A light-load adjusting device 36 is conveniently mounted on the keeper 11.

The electromagnet 8 comprises a core member 14 secured, preferably, by screws 15 to the lug 16 on the wall 4. A voltage coil 18 and current coils 19 are comprised in the electromagnet 8.

The disk 7 is mounted on a vertical shaft 21 that is supported by upper and lower bearing members 22 and 23 that are mounted, respectively, in lugs or projecting portions 24 and 25 on the wall 4.

The keeper 11 comprises a magnetizable member of substantially L-shape having its vertical arm adjustably secured to lugs 28 on the wall 4, preferably by screws 29 that extend through slots 30 in the vertical part of the member 11 which comprises a horizontal arm 27 constituting a flat plate of magnetizable material disposed above the core member 14. A projection or angular arm 33 on the keeper 11 extends forwardly through an opening in the wall 4 to the front compartment of the meter in the cover member 2. The member 36 constitutes the light load adjusting device and is of electrically conducting material and conforms, in side elevation, to the under and rear sides of the magnetizable keeper 11; it is also provided with a forwardly projecting portion 38 that extends through an opening in the wall 4. The member 36 constitutes a closed-circuit loop traversed by current generated by the voltage flux and is movably mounted on the member 11, preferably by screws 40 that extend through slots 41 in said member 36, the screws 40 being threaded into said member 11.

A screw 43 is connected between the projections 33 and 38 of the members 27 and 36, respectively, for moving the member 36 across the poles of the magnet 14. A leaf spring 42, having openings by which it is placed over the screws 40, biases the member 36 against the keeper 11.

The magnetizable portion 27 of the keeper 11 is preferably of cold, rolled steel although a combination of laminations may be utilized in lieu of such material in accomplishing the purpose of my invention. The member 27 is provided with a slot or opening 46 dividing the horizontal plate of the member 27 that extends across the projecting portions 47 of the electromagnet 8. The armature disk 7 is rotatably disposed between the slotted face 31 of the keeper 27 and the projecting portions 47 of the electromagnet 8. In addition to the slot 46, a thin strip 48, comprising a material of a special magnetizable alloy, is mounted on the slotted face 31 of the member 27, preferably on that side toward the disk 7. The member or strip 48, of magnetizable material, preferably covers the face of the keeper 27, but such disposition may not prove desirable for all designs; for example, the strip 48 may only partially cover the face in some applications.

The sheet of magnetizable material 48 is preferably mounted between the light-load adjusting loop 36 and the face of the magnetizable member 27.

The magnetizable sheet 48 is preferably intimately secured to the horizontal plate of the member 27 so that they cooperate mechanically in the manner of a single magnetizable keeper.

Restricting the area of the member 27 by slot 46 greatly improves the operation or performance of the meter on over-loads before the strip 48 is added. The approximate performance curves of the meter before and after cutting the slot 46 in the member 27 are shown by curves C and A, respectively, of Fig. 7.

It will be noted, however, that, although considerable improvement in over-load performance is obtained by restricting the area of the member 27 such curve of the meter under consideration becomes rather distorted and has the undesirable characteristic shown in Fig. 7, at points below full load. The slight rise in the performance curve between 100% and 200% is also noticeable and undesirable. Such percentages may obviously be varied by design to any other corresponding percentages such as, for example, 50% and 100%, or 300% and 600%, respectively. By adding the strip of magnetizable material 48 to the keeper 27, I change the characteristic curve of the meter with the slot 46 in the member 27, from curve A to curve B, shown in Fig. 7.

The curve B, it will be noted, is an excellent characteristic load curve for the meter at points below full load and retains the improved overload performance obtained by the slotting of the keeper 27. It will also be noted that a more nearly smooth and even load curve is obtained.

The theory of operation of the slotted magnetizable keeper and the magnetizable strip 48 may be more readily explained by reference to the curves shown on Fig. 6. The magnetizable member 27 has a flux density-magnetomotive force curve C. In operation, the member 27 operates in the lower portion of the magnetic curve C. The member 27 operates at such low magnetic density because of the air gap between the member 27 and the projections 47 of the core 8 and, therefore, operates near the point zero on the magnetization curve C, shown in Fig. 6.

The curve D, in Fig. 6, is an enlarged portion of that part of the curve C near zero and has the well-known magnetic characteristics of iron and steel near the point zero of the curve, whereby, at very low densities, a greater magnetomotive force is required per unit increase in magnetic induction than is required with somewhat higher densities, which phenomena is the reverse of the characteristics of the keeper near saturation. For example, the magnetomotive force corresponding to $a-b$, Fig. 6, produces less than one-half of the increase of flux density that is produced by the same value of magnetomotive force $b-c$.

The slot in the member 27 has no merit, in itself, in producing the improved overload performance but it does affect the magnetic characteristic of the member 27. Referring to Fig. 4, the member 27 is divided into two pole portions by the slot 46. The current flux from the electromagnet flows from one pole portion to the other through the member 27. The object of the slot 46 is to restrict or limit the area of a part of the member 27 so that the current flux in flowing from one pole portion to the other through such restricted or limited area is affected by the permeability of that portion in the manner shown by curve D of Fig. 6. The area and length of material may be restricted in any suitable manner provided, however, that it is reduced in such manner as to cause a part of the circuit for the magnetic flux to have the permeability characteristics shown in curve D of Fig. 6. The slot is particularly convenient in the modification illustrated and described for causing the circuit for the magnetic flux to have such permeability characteristics.

The member 27 operates on that part of the magnetic saturation curve shown by the curve D of Fig. 6. While the magnetomotive force of the current coils 19 of the meter increases proportionally to the current in the meter, the magnetic characteristics of the member 27 vary in such a way as to offer proportionally less reluctance, in the manner shown by curve D in Fig. 6. The result of such magnetic action of the member 27 tends to increase the proportion of flux at certain overloads and thus causes the meter to run at a faster rate than it otherwise would.

The magnetic characteristics obtained by slotting the member 27 produce the distorted curve A shown in Fig. 7. Such distortion is corrected by the member 48 of magnetizable material that saturates at relatively small values of flux densities. The member 48 is adapted to carry just the correct amount of magnetic flux to obviate the distortion shown in curve A, Fig. 7. However, the saturation curve of the member 48 is such that it does not affect the overload curve of the meter materially after it passes a point at about 200% normal load on the meter. It will be obvious to those skilled in the art that the member 48 may be so adjusted that it no longer affects the overload of the meter materially after it passes any point, not being limited particularly to 200%. The member 48 does not carry all of the magnetic flux but only carries an amount sufficient to produce the curve correction shown.

It will be understood that the percentage referred to in the above paragraphs are mentioned with the express provision that they refer to Fig. 7 as an example of a percentage registration curve of a modification of my invention and not to all embodiments that may be constructed in accordance therewith. I mention this because there is a present tendency to alter the design of meters slightly and to greatly under rate them. For example, meters that have heretofore been designated 20 ampere meters may be now designated 10 ampere meters. The performance of such altered meters is as efficient at 400% load as a 10 ampere meter heretofore has been at 200% load.

In practice, I prefer that the member 48 shall be made of an alloy consisting of approximately 70% nickel, 28% copper and the remainder of various impurities. It will be quite apparent that the same result may be obtained with other materials having a composition somewhat similar to the composition specified above, that I prefer to use.

In addition to compensating for the overload error of a watthour meter, the member 48 provides an inherent temperature compensation for the meter. The member 48 is of a material the magnetic characteristics of which vary with temperature changes and, therefore, the effective air gap of the meter is increased or decreased to compensate for such temperature changes.

It is well known to those versed in the art that induction meters that are not provided with some temperature compensation have an inherent tendency to register a lower percentage of the true magnitude of energy to be measured on temperatures below normal and vice versa on temperatures above normal. The member 48 comprises a material having a permeability that increases with a decrease in temperature and decreases with an increase in temperature. Such action has the effect of making the effective air gap of the meter smaller as the temperature decreases and larger as the temperature increases, whereby, under similar load conditions, more flux passes through the air gap at relatively low temperatures with a consequent proportional increase in the speed of the meter and vice versa on relatively high temperatures. By making the member 48 of the material specified above and of a proper thickness, the watthour meter is compensated accurately for temperature variations at or about 100% power factor.

While I have found that the addition of the strip 48 improves the load curve at loads lower than 100%, it is quite possible and probable that meters might be constructed in which the strip 48 would not be necessary. The strip 48 does not, in itself, assist in producing the improved overload performance, but the overload improvement in the operation of the meter may quite readily be effected by the magnetizable member 27 alone. This point is important because, although materials have been used heretofore in such a way as to saturate on overloads (i. e. to operate at the upper part of curve C of Fig. 6) the idea of using a compensating material along the lower part of the magnetic curve D (Fig. 6) has neither been used nor suggested heretofore, so far as I am aware.

It will be readily understood that various changes and modifications may be made in my invention without departing from the spirit and scope thereof, as set forth in the appended claims.

I claim as my invention:

1. In a meter, an armature, an electromagnet disposed on one side of said armature, a magnetizable member for compensating said meter for load errors disposed on the other side of said armature, said member having a restricted flux path therein, and an auxiliary magnetizable member having a negative temperature coefficient of permeability comprising a relatively thin strip mounted on the face of said first member for compensating said meter for temperature and light load errors.

2. In a meter, an armature, an electromagnet disposed on one side of said armature, a magnetizable member disposed on the other side of said armature, said member having an opening therein, and an auxiliary magnetizable member having a predetermined temperature coefficient of permeability adjacent to said member for affecting the operation of said armature.

3. In a meter, an armature, an electromagnet disposed on one side of said armature, a magnetizable member disposed on the other side of said armature, said member having an opening therein, and an auxiliary magnetizable member having a predetermined magnetic characteristic for affecting the operation of said armature.

4. The combination with an armature and an electromagnet disposed on one side of said armature for actuating the latter, of a member of cold rolled steel mounted on the other side of said armature, said member having an opening therein, and a member magnetically cooperating with said steel member, said last-named member having different magnetic and temperature characteristics than said steel member.

5. In combination, an armature, an electromagnet mounted on one side of said armature, and a plurality of magnetizable members mounted on the other side of said armature, one of said members having a restricted area therein, and one of said members comprising a material having a predetermined negative temperature coefficient of permeability.

6. In an induction meter, the combination with an armature and an electromagnet for turning said armature of means for compensating said armature for temperature and load errors comprising a slotted magnetizable member and a sheet of magnetizable material cooperating therewith, said means being in magnetic circuit relation with said armature and said electromagnet.

7. In an induction meter, the combination with an armature and an electromagnet for turning said armature, of means for compensating said armature for temparature and overload comprising a slotted magnetizable member and a sheet of magnetizable material cooperating therewith, said sheet consisting of substantially an alloy of approximately 70% nickel, 28% copper and 2% impurities.

8. In combination a pivoted member, means for rotating said member with coacting phase-displaced fluxes, said means including a magnetizable keeper, means for causing said keeper to increase in effective permeability with respect to said member with an increase of one of said fluxes at a predetermined magnitude thereof, and magnetizable means having a temperature coefficient of permeability different from said keeper cooperating with said keeper for compensating the rotation of said member for load and temperature variations.

9. In a meter, an armature, an electromagnet disposed on one side of said armature, a magnetizable member mounted on the other side of said armature, and means, including a sheet of magnetizable material adjacent said member, for compensating errors in said meter caused by light load and temperature changes, said sheet having a pronounced negative temperature coefficient of permeability.

10. In an induction meter, the combination with an armature and a flux-producing means for turning said armature, of means associated with said flux-producing means for compensating said meter for load and temperature errors comprising a magnetizable member having an effective increasing permeability with respect to said armature with an increase in load on said meter and a second magnetizable member coacting therewith having a negative temperature coefficient of permeability.

11. In an induction meter, the combination with an armature and a magnetic core having windings thereon for producing coacting fluxes to turn said armature, of means for compensating said meter for errors incident to load and temperature changes comprising a magnetizable member disposed in the path of said coacting fluxes for primarily increasing the effective driving fluxes on said disc with an increase in the load on said meter above a predetermined load to compensate for overload damping and a second magnetizable member having a negative temperature coefficient of permeability cooperating with said first named magnetizable member for both compensating said meter for load errors caused by said first member at loads below said predetermined load and for changing the effective air gap of said coacting fluxes between said armature and said magnetic core with changes in temperature.

12. In combination, an armature, an electromagnet mounted near said armature for turning the same, and a plurality of magnetizable members coacting with said electromagnet, one of said members having a restricted area for improving the overload operation of said armature at loads above a predetermined load, and the other of said members comprising a material having a predetermined negative temperature coefficient of permeability for improving the operation of said meter at loads below said predetermined load and also for improving the operation of said armature upon changes in temperature.

In testimony whereof, I have hereunto subscribed my name this twenty-first day of November, 1927.

ELMER G. RATZ.